3,027,773
VARIABLE PITCH SHEAVE ARRANGEMENTS
David Firth, South Bend, and Jackson Chung, Mishawaka, Ind., assignors to Dodge Manufacturing Corporation, Mishawaka, Ind., a corporation of Indiana
Filed July 27, 1959, Ser. No. 829,673
5 Claims. (Cl. 74—230.17)

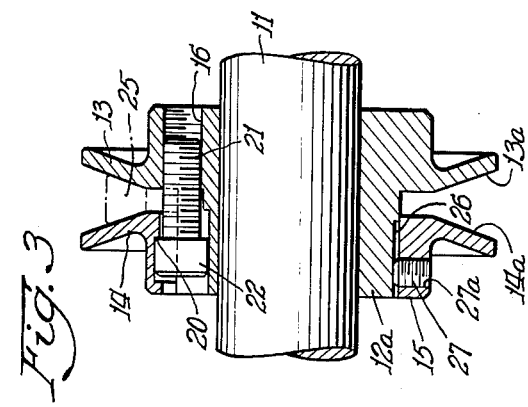
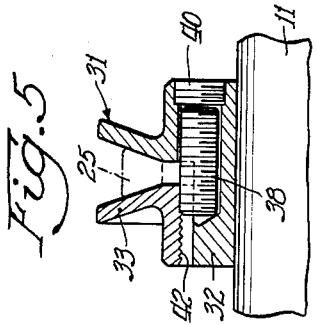
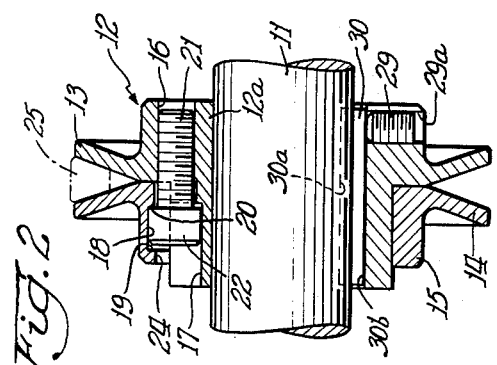
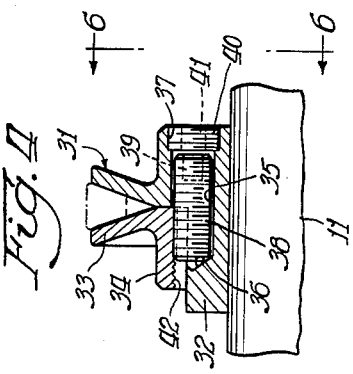
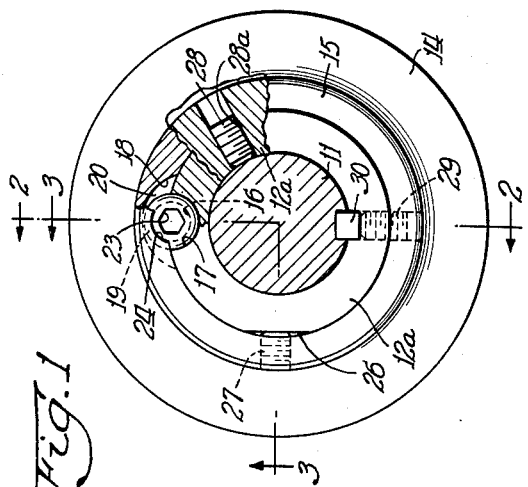
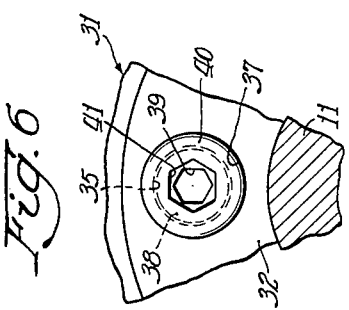
Inventors:
David Firth and
Jackson Chung United States Patent Office 3,027,773
Patented Apr. 3, 1962

This invention relates to variable pitch sheave arrangements for V-belt drives and aims to provide improved and simplified arrangements that at the same time permit infinite variations in pitch diameter within the range of size of the parts.

The invention will be understood by reference to the accompanying drawings, showing illustrative embodiments of the invention, and by reference to the following specification taken together therewith, and in which drawings—

FIGURE 1 is an end elevational view of a variable pitch sheave arrangement in accordance herewith;

FIGURE 2 is an axial diametrical section taken on the line 2—2 of FIG. 1, showing a maximum pitch diameter and indicating a section of the belt diagrammatically;

FIGURE 3 is an axial quarter section taken on the line 3—3 of FIG. 1 and showing a minimum pitch diameter;

FIGURE 4 is a view similar to FIG. 2 but showing a modified arrangement for changing the pitch diameter;

FIGURE 5 is a view similar to FIG. 3 of the arrangement shown in FIG. 4 with a different pitch diameter; and FIGURE 6 is a fragmentary enlarged elevational view of the structure of FIG. 4, for example, taken on the line 6—6 of FIG. 4.

In the illustrative constructions of the drawings, there are here shown improvements in expansible and contractible V-belt pulleys of the type in which adjacent members having opposed frusto-conical surfaces are axially movable toward and away from each other to increase or decrease the effective pitch diameter of the pulley or sheave, a typical shaft upon which the sheaves are mounted being indicated at 11, which shaft may be either a driven or a driving member.

In accordance with the present invention, turning first to FIGS. 1 to 3 inclusive, there is here shown a hub member 12 for the sheave having a hub portion 12a for telescoping onto the shaft 11, the member 12 having a first circular flange element 13 integral therewith. For cooperation with the member 12 is a second circular flange element 14 having a secondary integral hub 15 for telescoping onto the hub 12a of the member 12. In one end of the hub 12a is a tapped hole 16, this being at the end of the hub which is radially aligned with the flange element 13 of the member 12. At the other end of the hub 12a, which is here axially extended and upon which the flange element 14 telescopes, is an unthreaded groove 17 of an arc approximately a half circle. Facing the groove 17, and in the inner periphery of the hub 15 of the second flange element 14, is an unthreaded groove 24 in which is an arcuate slot 18. Slot 18 is shouldered at each end as at 19 and 20.

In the threaded hole 16 is the screw 21 which has the head 22, the latter lying partly in the groove 17 in the hub 12a of the member 12 and partly in the slot 18 of the groove 24 as in the hub 15 of the flange element 14. In the slot the head 22 is arranged to abut at one end the shoulder 19 and at the other end the shoulder 20. The screw may be so located by being placed into relationship with the member 12 simultaneously with the flange element 14. Provision for rotating the screw 21 in this instance includes a hexagonal socket 23 in the face of the screw head 22 into which a wrench of the so-called "Allen" type may be inserted. Access to the socket 23 of the screw head for the wrench is possible through the groove 17 in the hub 12a and the groove 24 in the hub element 15.

So constructed and arranged the flange element 14 is slidable axially on the hub 12a of the member 12. Such sliding movement may be effected by rotation of the screw 21. The screw moves into and out of the member 12, the element 14 moving with the screw by reason of interlock of the screw head with slot 18. Rotation of the screw 21 counterclockwise (FIG. 1) will move the screw to the left in FIG. 2 and thereby move the flange element 14 axially to the left to a position say such as shown in FIG. 3, where the distance between the flange elements 13 and 14 is say at the maximum, providing a minimum pitch diameter for a power transmission V-belt such as indicated at 25. Conversely, rotating the screw 21 clockwise (FIG. 1) from the position shown in FIG. 3 will move the screw to the right in FIG. 3 and to the position shown for example in FIG. 2, in which the flange elements 13 and 14 are nearest together thus causing the belt 25 to move radially outwardly with respect to the flanges and to provide the maximum pitch diameter for the sheave.

As will be understood from the drawings and the foregoing description, the flange elements 13 and 14 provide the opposed frusto-conical surfaces 13a and 14a, respectively, axially movable toward and away from each other as earlier hereinabove mentioned.

It will be understood that the flange element 14 is not rotatable with respect to the member 12. After the axial positions of the member 12 and element 14 have been established, first of the member 12 on the shaft 11 and then of the element 14 on the member 12, means are provided for fixing these positions, as next described. The member 12 is shown having on its hub 12a an axially extending flat surface 26 against which may be pressed a set screw 27 screwed into a radially extending tapped hole 27a that passes through hub 15 of element 14. The flat surface 26 is at the end of the hub 12a radially aligned with the flange element 14. At the other end of the hub 12a are shown a pair of set screws 28 and 29, circumferentially spaced apart, which pass through threaded holes 28a and 29a respectively in the hub 12a. Set screw 28 presses directly against the shaft 11, in this instance, while set screw 29 is radially and axially aligned with a longitudinal key 30 that is slid into keyways 30a and 30b in the shaft 11 and hub 12a respectively. Key 30 prevents relative rotative movement of member 12 with respect to the shaft and causes it and the element 14 to rotate with the shaft. Set screws 28 and 29 prevent relative axial movement of the hub 12a with respect to the shaft and set screw 29 further serves to prevent accidental displacement of the key 30 from the keyways.

In the modification shown in FIGS. 4, 5 and 6 a relatively stationary flange member 31 has the hub 32 upon which is axially slidable the flange member 33 having the hub 34, the hub 32 being axially extended for this purpose similarly to the previous figures. However, in this modification, hub 32 axially intermediately thereof has a plain hole 35 therein having a bottom or shoulder 36 at its inner end. The outer end of the hole 35 adjacent the flange of the flange member 31 is enlarged and tapped as at 37. In the plain hole 35 is a rotatable headless screw 38 having at its outer end a non-circular or hexagonal socket 39. In the tapped enlargement 37 is screwed a retaining ring screw 40 that is pierced by a noncircular or hexagonal bore 41.

In the hub 34 of the relatively movable flange member 33 is an arcuate or parti-cylindrical groove that is tapped as at 42 to threadedly engage the headless screw 38. The screw 38 can rotate in the hub 32 of the relatively stationary member 31 without moving axially therein, being held from said axial movement by the shoulder 36 at one end of the groove 35 and retaining screw 40 at the other end.

In the latter form, access for a wrench to rotate the screw 38 is had through the bore 41 of the retaining screw 40, the socket 39 being smaller than the bore 41 for this purpose. Rotation of screw 38 counterclockwise (FIG. 6) will move flange member 33 from position of FIG. 4, say, to position of FIG. 5, and rotating it clockwise will return flange member 33 to position of FIG. 4.

In each case the screw 21 or 38 as the case may be is held axially stationary with respect to one of the flange elements, such as in one case the flange element 14 and in the other case the flange element 31. Also, one of the flange elements, in one case the flange element 14 and in the other case the flange element 33, is relatively axially slidable on the flange element 12 or the flange element 31, as the case may be, thus exemplifying the language of the appended claims, and thereby simplifying the construction and operation of the sheaves.

Furthermore, since the flange elements do not move relatively rotatively, and ttherefore the set screw 27 and the flat 26 are always in mutual engagement, infinite variations in pitch diameters are possible.

Such changes may be made as fall within the scope of the appended claims without departing from the invention.

What is claimed herein is:

1. In a variable pitch sheave, a member having a hub for telescoping onto a shaft and having a first circular flange element integral with said hub, a second circular flange element having a secondary hub telescoping onto the hub of the member and axially slidable thereon, and a headed adjusting screw having shouldered engagement with said second flange element and having threaded engagement with the member whereby rotation of said screw moves the second element axially with respect to the first element; wherein the head of the adjusting screw is received in a parti-cylindrical untapped slot in the second flange element, said slot having axially facing shoulders at each end integral with the secondary hub for abutting the screw head, and the hub of the member has a parti-cylindrical untapped groove radially opposite said slot and also receiving the screw head and open at its end for entry of the screw head moving axially with the secondary hub and extending into the slot thereof.

2. The sheave of claim 1 wherein the screw head has an internal non-circular socket therein for insertion of a wrench of the so-called "Allen" type.

3. In a variable pitch sheave a member having a hub for telescoping onto a shaft and having a first circular flange element integral therewith, a second circular flange element having a secondary hub telescoping onto the hub of the member and axially slidable thereon, a plain hole in said member, a headless screw in said hole having threaded engagement with said second flange element, a tapped enlargement of said plain hole at the outer end thereof, a retaining ring screw threaded into said enlargement and tight on the base of said enlargement without binding said headless screw, and a non-circular socket in the outer end of said headless screw accessible through a passage axially aligned therewith through said ring screw having its smallest diameter as large as the largest diameter of the socket, whereby rotation of said headless screw moves the second element axially with respect to the member.

4. The sheave of claim 3 wherein the headless screw is held from axial movement by a shoulder in one end of said plain hole and by said retaining screw in the other end.

5. The sheave of claim 3 wherein the passage through the retaining screw is a non-circular socket.

References Cited in the file of this patent
UNITED STATES PATENTS

| | | |
|---|---|---|
| 2,128,116 | Boone | Aug. 23, 1938 |
| 2,234,917 | Koch | Mar. 11, 1941 |
| 2,718,155 | Firth | Sept. 20, 1955 |
| 2,890,592 | Keepers | June 16, 1959 |